(12) United States Patent
Li et al.

(10) Patent No.: US 12,338,167 B2
(45) Date of Patent: Jun. 24, 2025

(54) ENHANCED ION EXCHANGE METHODS

(71) Applicant: CORNING INCORPORATED, Corning, NY (US)

(72) Inventors: Qiao Li, Horseheads, NY (US); Santona Pal, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 377 days.

(21) Appl. No.: 17/885,976

(22) Filed: Aug. 11, 2022

(65) Prior Publication Data

US 2022/0380252 A1 Dec. 1, 2022

Related U.S. Application Data

(62) Division of application No. 16/585,190, filed on Sep. 27, 2019, now Pat. No. 11,447,417.

(60) Provisional application No. 62/738,415, filed on Sep. 28, 2018.

(51) Int. Cl.
| | |
|---|---|
| *C03C 21/00* | (2006.01) |
| *C03C 3/087* | (2006.01) |
| *C03C 3/12* | (2006.01) |
| *C03C 4/18* | (2006.01) |

(52) U.S. Cl.
CPC .............. *C03C 21/002* (2013.01); *C03C 3/12* (2013.01); *C03C 4/18* (2013.01); *C03C 21/005* (2013.01); *C03C 2201/50* (2013.01)

(58) Field of Classification Search
CPC .................................................. C03C 21/002
See application file for complete search history.

(56) References Cited

U.S. PATENT DOCUMENTS

| | | |
|---|---|---|
| 3,410,673 A | 11/1968 | Marusak |
| 3,441,398 A | 4/1969 | Hess |
| 8,312,739 B2 | 11/2012 | Lee et al. |
| 8,561,429 B2 | 10/2013 | Allan et al. |
| 8,854,623 B2 | 10/2014 | Fontaine et al. |

(Continued)

FOREIGN PATENT DOCUMENTS

| | | |
|---|---|---|
| CN | 102149649 A | 8/2011 |
| CN | 102992600 A | 3/2013 |

(Continued)

OTHER PUBLICATIONS

International Search Report and Written Opinion of the European International Searching Authority; PCT/US2019/053361; Mailed Dec. 12, 2019; 12 Pgs.

(Continued)

*Primary Examiner* — Jodi C Franklin
(74) *Attorney, Agent, or Firm* — Travis B. Gasa

(57) ABSTRACT

Methods of manufacturing a glass-based article include exposing a glass-based substrate to a molten salt bath including a first salt and a second salt. In aspects, the first salt includes a metal ion that has a larger ionic radii than an alkali metal of the glass-based substrate and a first anion, and the second salt dissolved in the molten salt bath includes the same metal ion as the first salt and a second anion different from the first anion. In aspects, the first salt is potassium nitrate, the second salt is potassium carbonate, and a concentration of the potassium carbonate remains at or below its solubility limit in the molten salt bath.

19 Claims, 6 Drawing Sheets

(56) References Cited

U.S. PATENT DOCUMENTS

| | | |
|---|---|---|
| 8,919,150 B2 | 12/2014 | Imai et al. |
| 9,758,428 B1* | 9/2017 | Zhang ................... C03C 21/005 |
| 9,828,286 B2 | 11/2017 | Kashima et al. |
| 2013/0061636 A1* | 3/2013 | Imai ...................... C03C 21/002 65/30.14 |
| 2014/0178691 A1* | 6/2014 | Kreski .................. C03C 21/002 65/30.14 |
| 2014/0370302 A1* | 12/2014 | Amin .................... C03C 21/005 65/30.13 |
| 2016/0130179 A1* | 5/2016 | Kashima ................. G01B 5/28 428/141 |
| 2016/0207828 A1 | 7/2016 | Kashima et al. |
| 2016/0229742 A1* | 8/2016 | Wondraczek ............. C03C 4/20 |
| 2016/0376186 A1 | 12/2016 | Gross |
| 2017/0036949 A1* | 2/2017 | Borrelli .................. C03C 17/25 |
| 2017/0166478 A1 | 6/2017 | Gross et al. |
| 2017/0233287 A1* | 8/2017 | Li .......................... C03C 3/089 428/172 |
| 2017/0313620 A1* | 11/2017 | Kashima ................. C03C 3/087 |
| 2017/0313621 A1* | 11/2017 | Kashima ................. C03C 15/00 |
| 2018/0141854 A1* | 5/2018 | Huang ................... C03C 21/005 |
| 2018/0319706 A1* | 11/2018 | Murayama ............. C03C 3/091 |
| 2018/0327305 A1 | 11/2018 | Amin et al. |
| 2019/0071350 A1 | 3/2019 | Amin et al. |
| 2019/0112220 A1* | 4/2019 | Alder ...................... C03C 3/087 |
| 2019/0161386 A1 | 5/2019 | Gross et al. |
| 2019/0161390 A1 | 5/2019 | Gross et al. |
| 2019/0352227 A1* | 11/2019 | Koike ..................... C03C 3/091 |

FOREIGN PATENT DOCUMENTS

| | | | | |
|---|---|---|---|---|
| CN | 104640821 A | 5/2015 | | |
| CN | 104736495 A | 6/2015 | | |
| CN | 105408272 A | 3/2016 | | |
| CN | 105873871 A | 8/2016 | | |
| CN | 106866000 A | 6/2017 | | |
| CN | 107074638 A | 8/2017 | | |
| CN | 107089793 A | 8/2017 | | |
| CN | 107207333 A | 9/2017 | | |
| CN | 108290781 A | 7/2018 | | |
| CN | 108516681 A | * 9/2018 | ............ | C03B 13/00 |
| CN | 108975727 A | * 12/2018 | ............ | C03B 18/02 |
| GB | 1105434 A | 3/1968 | | |
| JP | 2016-132597 A | 7/2016 | | |
| WO | 2017/087742 A1 | 5/2017 | | |

OTHER PUBLICATIONS

Mauro et al; "Accelerating the Design of Functional Glasses Through Modeling"; Chem. Mater. 2016, 28, pp. 4267-4277.

Xiangchen et al; "The Effect of Impurity Ions in Molten Salt KNO3 on Ion-Exchange and Strengthening of Glass"; J. Non-Cryst. Solids 1986; 80(13) pp. 313-318.

Youmei et al; "Effect of Additives in the Salt Bath on Glass Strengthening"; J. Non Cryst. Solids 1986; 80(13) pp. 300-306.

Chinese Patent Application No. 201980064600.5, Office Action dated Aug. 15, 2022, 5 pages (English translation only), Chinese Patent Office.

\* cited by examiner

ENHANCED ION EXCHANGE METHODS

CROSS-REFERENCE TO RELATED APPLICATIONS

This application is a divisional of and claims the benefit of priority under 35 U.S.C. § 120 of U.S. patent application Ser. No. 16/585,190 filed on Sep. 27, 2019, which claims the benefit of priority of U.S. Provisional Application Ser. No. 62/738,415 filed on Sep. 28, 2018, the content of which is relied upon and incorporated herein by reference in its entirety.

FIELD

Embodiments of the disclosure generally relate to enhanced methods of ion exchanging glass-based articles using baths of mixtures of different molten salts to deliver the same alkali metal for strengthening; and to glass-based articles and consumer products made by these methods.

BACKGROUND

Glass-based articles are used in many various industries including consumer electronics, automotive, architecture, defense, medical, and packaging. For consumer electronics, glass-based articles are used in electronic devices as cover plates or windows for portable or mobile electronic communication and entertainment devices, such as mobile phones, smart phones, tablets, video players, information terminal (IT) devices, laptop computers, navigation systems and the like. In architecture, glass-based articles are included in windows, shower panels, and countertops; and in transportation, glass-based articles are present in automobiles, trains, aircraft, sea craft. Glass-based articles are suitable for any application that requires superior fracture resistance but thin and light-weight articles. For each industry, mechanical and/or chemical reliability of the glass-based articles is typically driven by functionality, performance, and cost. Improving the mechanical and/or chemical reliability of these articles is an ongoing goal.

Chemical treatment is a strengthening method to impart a desired/engineered/improved stress profile having one or more of the following parameters: compressive stress (CS), depth of compression (DOC), and central tension (CT). Many glass-based articles, including those with engineered stress profiles, have a compressive stress that is highest or at a peak at the glass surface and reduces from a peak value moving away from the surface, and there is zero stress at some interior location of the glass article before the stress in the glass article becomes tensile. Chemical strengthening by ion exchange (IOX) of alkali-containing glass is a proven methodology in this field.

During ion exchange (IOX) strengthening, a glass-based substrate is brought into contact with a molten chemical salt so that an alkali metal of a relatively small ionic diameter in the glass-based substrate is ion-exchanged with an alkali metal of a relatively large ionic diameter in the chemical salt, therefore generating compressive stress on the surface to strengthen the glass. In a typical IOX process, temperature and time are two process parameters that have an impact on the extent of ion exchange. In addition, other parameters include glass-substrate properties on its surface and in its center/bulk (composition, structure), and salt bath chemistry (composition, activity). For example, one way to engineer stress profiles to achieve desired parameters is to design new glass compositions. In the salt bath chemistry area, there has been focus on how to remove poisoning ions in the salt, which interfere with salt bath ions present for ion exchange, for bath purification and regeneration. The poisoning ions can be a small monovalent ion (like $Na^+$ or $Li^+$) eluted from the glass during the ion exchange or some bivalent ions (like $Ca^{2+}$ and $Mg^{2+}$) as contaminants existing in the salt. Conventionally, removal of the poisoning ions has been realized by adding potassium and/or sodium salt additives to the molten salt so that the poisoning ions can be precipitated out from the molten bath as a solid salt. In order for this removal to be effective, solubility of the salt additive in the molten ion-exchange salt (often $KNO_3$-based) should be very low. In practice, the amount of the salt additive, which acts as a getter of poisoning ions, is often purposely kept at minimum, resulting in low amounts of the salt additive remaining in the molten bath after its usage. Gettering salt additives are typically in solid state in the molten baths, and poisoning ions are precipitated out of the baths in solid state.

There is an on-going need to utilize molten bath salts efficiently and cost-effectively. There is also a continuing need to provide glass-based articles having mechanical and/or chemical reliability for their industry.

SUMMARY

Aspects of the disclosure pertain to glass-based articles and methods for their manufacture.

An embodiment is a method of manufacturing a glass-based article comprising: exposing a glass-based substrate that contains an alkali metal oxide in a base composition, the glass-based substrate having opposing first and second surfaces defining a substrate thickness (t), to an ion exchange treatment to form the glass-based article, the ion exchange treatment including a bath comprising: a mixture of molten salts comprising: a first salt including a metal ion that has a larger ionic radii than the alkali metal of the alkali metal oxide in the base composition; and a second salt that is dissolved in the first salt and includes the same metal ion as the first salt with an anion different from the first salt.

Another embodiment is method of manufacturing a glass-based article comprising: exposing a glass-based substrate that contains lithium, the glass-based substrate having opposing first and second surfaces defining a substrate thickness (t), to an ion exchange treatment to form the glass-based article, the ion exchange treatment including a bath comprising: a mixture of molten salts comprising: potassium nitrate ($KNO_3$); optionally sodium nitrate ($NaNO_3$); and potassium carbonate ($K_2CO_3$) and optionally sodium carbonate ($Na_2CO_3$) that is respectively dissolved in the potassium nitrate ($KNO_3$) and optionally the sodium nitrate ($KNO_3$); wherein the $K_2CO_3$ and the optional $Na_2CO_3$ remain at or below their solubility limit and any lithium ions that are or become present in the bath remain at or below their solubility limit.

A further embodiment includes: a glass-based article formed by any method disclosed herein.

Another embodiment is a consumer electronic product comprising: a housing having a front surface, a back surface, and side surfaces; electrical components provided at least partially within the housing, the electrical components including at least a controller, a memory, and a display, the display being provided at or adjacent the front surface of the housing; and a cover disposed over the display; wherein a portion of at least one of the housing and the cover comprises any glass-based article disclosed herein.

According to aspect (1), a method of manufacturing a glass-based article is provided. The method comprises exposing a glass-based substrate to a molten salt bath to form the glass-based article. The glass-based substrate contains an alkali metal oxide, and the glass-based substrate has opposing first and second surfaces defining a substrate thickness (t). The molten salt bath comprises: a first salt including a metal ion that has a larger ionic radii than the alkali metal of the alkali metal oxide and an anion; and a second salt that is dissolved in the molten salt bath and includes the same metal ion as the first salt and an anion different from the anion of the first salt.

According to aspect (2), the method of aspect (1) is provided, wherein the first salt is a non-carbonate salt and the second salt is a carbonate salt.

According to aspect (3), the method of aspect (1) or (2) is provided, wherein the alkali metal oxide in the glass-based substrate comprises lithium; the first salt comprises potassium nitrate, sodium nitrate, or a mixture of potassium and sodium nitrates; and the second salt comprises one or more of: $K_2CO_3$, $Na_2CO_3$, $K_3PO_4$, $Na_3PO_4$, $K_2SO_4$, $Na_2SO_4$, $K_3BO_3$, $Na_3BO_3$, KCl, NaCl, KF, and NaF.

According to aspect (4), the method of any of aspects (1) to (3) is provided, wherein a temperature of the molten salt bath is in the range of greater than or equal to 370° C. to less than or equal to 500° C.

According to aspect (5), the method of any of aspects (1) to (4) is provided, wherein the concentration of the second salt remains at or below its solubility limit in the molten salt bath.

According to aspect (6), the method of any of aspects (1) to (5) is provided, wherein the concentration of any poisoning ions is at or below their solubility limit in the molten salt bath.

According to aspect (7), the method of aspect (6) is provided, wherein the poisoning ions comprise the alkali metal of the alkali metal oxide in the glass-based substrate.

According to aspect (8), the method of any of aspects (1) to (7) is provided, wherein the glass-based article comprises the metal ion at a non-zero concentration that varies from the first surface to a depth of layer (DOL) with respect to the metal ion.

According to aspect (9), the method of aspect (8) is provided, wherein the DOL is greater than or equal to 5 micrometers.

According to aspect (10), the method of any of aspects (1) to (9) is provided, wherein the glass-based article comprises one or more additional metal oxides selected from the group consisting of: silver oxide, copper oxide, zinc oxide, titanium oxide, rubidium oxide, cesium oxide, calcium oxide, and magnesium oxide, wherein a concentration of the one or more additional metal oxide varies from the first surface to at least a portion of the substrate thickness (t).

According to aspect (11), the method of any of aspects (1) to (10) is provided, wherein the glass-based article comprises a compressive stress of greater than or equal to 350 MPa.

According to aspect (12), the method of any of aspects (1) to (11) is provided, wherein the glass-based article comprises a depth of compression (DOC) of greater than or equal to 30 micrometers.

According to aspect (13), the method of any of aspects (1) to (12) is provided, wherein the glass-based article comprises a ratio of depth of compression (DOC) to a spike depth of layer ($DOL_{sp}$) that is greater than or equal to 1:1.

According to aspect (14), the method of any of aspects (1) to (13) is provided, wherein the glass-based substrate comprises a soda-lime silicate, an alkali-aluminosilicate, an alkali-containing borosilicate, an alkali-containing aluminoborosilicate, or an alkali-containing phosphosilicate.

According to aspect (15), the method of any of aspects (1) to (14) is provided, further comprising exposing the glass-based substrate to an additional strengthening treatment selected from the group consisting of: ion exchange, thermal annealing, and combinations thereof.

According to aspect (16), the method of any of aspects (1) to (15) is provided, wherein t is in the range of from 50 microns to 10 millimeters.

According to aspect (17), a method of manufacturing a glass-based article is provided. The method comprises exposing a glass-based substrate to a molten salt bath to form the glass-based article. The glass-based substrate contains lithium, and the glass-based substrate has opposing first and second surfaces defining a substrate thickness (t). The molten salt bath comprises: potassium nitrate ($KNO_3$); and potassium carbonate ($K_2CO_3$) that is dissolved in the molten salt bath. The concentration of the $K_2CO_3$ remains at or below its solubility limit in the molten salt bath, and the concentration of lithium ions in the molten salt bath remains at or below their solubility limit in the molten salt bath.

According to aspect (18), the method of aspect (17) is provided, wherein the molten salt bath further comprises: sodium nitrate ($NaNO_3$); and sodium carbonate ($Na_2CO_3$) that is dissolved in the molten salt bath. The concentration of the $Na_2CO_3$ remains at or below its solubility limit in the molten salt bath.

According to aspect (19), the method of aspect (17) or (18) is provided, wherein the glass-based article comprises potassium at a non-zero concentration that varies from the first surface to at least a portion of the substrate thickness (t).

According to aspect (20), the method of any of aspects (17) to (19) is provided, wherein the glass-based article comprises sodium at a non-zero concentration that varies from the first surface to at least a portion of the substrate thickness (t).

According to aspect (21), the method of any of aspects (17) to (20) is provided, wherein a temperature of the molten salt bath is in the range of greater than or equal to 370° C. to less than or equal to 500° C.

According to aspect (22), the method of any of aspects (17) to (21) is provided, wherein a molar ratio of the $K_2CO_3$ to the sum of $K_2CO_3$ and $KNO_3$ is in the range of 0.05 to 0.15.

According to aspect (23), the method of any of aspects (17) to (22) is provided, wherein the glass-based substrate comprises an alkali-aluminosilicate.

According to aspect (24), the method of any of aspects (17) to (23) is provided, wherein the molten salt bath comprises by weight: $KNO_3$ in an amount in the range of greater than 0 to 99.9%; $NaNO_3$ in an amount in the range of 0 to 99.9%; $K_2CO_3$ in an amount in the range of 0.1 to 20%; and $Na_2CO_3$ in an amount in the range of 0 to 20%, with the proviso that the amounts of $KNO_3$, $NaNO_3$, $K_2CO_3$, and $Na_2CO_3$ total 100%.

According to aspect (25), the method of any of aspects (17) to (24) is provided, wherein the molten salt bath comprises by weight: $KNO_3$ in an amount in the range of 40 to 99.5%; $NaNO_3$ in an amount in the range of 0 to 60%; $K_2CO_3$ in an amount in the range of 0.5 to 10%; and $Na_2CO_3$ in an amount in the range of 0 to 10%.

According to aspect (26), the method of any of aspects (17) to (25) is provided, wherein t is in the range of from 50 microns to 10 millimeters.

According to aspect (27), a glass-based article formed by the method of any of aspects (1) to (26) is provided.

According to aspect (28), a glass-based article is provided. The glass-based article comprises: opposing first and second surfaces defining a thickness (t); a compressive stress region extending from the first surface of the glass-based article to a depth of compression (DOC); a spike region extending from the first surface to a depth of layer of a spike region ($DOL_{sp}$); a sodium ion concentration profile, wherein the sodium ion concentration profile comprises a convex region in the spike region.

According to aspect (29), the glass-based article of aspect (28) is provided, wherein the convex region is located between the first surface and a depth of 5 μm.

According to aspect (30), the glass-based article of any of aspects (28) to (29) is provided, further comprising lithium.

According to aspect (31), the glass-based article of any of aspects (28) to (30) is provided, wherein the $DOL_{sp}$ is greater than or equal to 5 micrometers.

According to aspect (32), the glass-based article of any of aspects (28) to (31) is provided, wherein the ratio of the DOC to the $DOL_{sp}$ is greater than 1:1.

According to aspect (33), the glass-based article of any of aspects (28) to (32) is provided, wherein DOC is greater than or equal to 30 micrometers.

According to aspect (34), the glass-based article of any of aspects (28) to (33) is provided, comprising a compressive stress of greater than or equal to 350 MPa.

According to aspect (35), the glass-based article of any of aspects (28) to (34) is provided, wherein t is in the range of from 50 microns to 10 millimeters.

According to aspect (36), a consumer electronic product is provided. The consumer electronic product comprises: a housing having a front surface, a back surface, and side surfaces; electrical components provided at least partially within the housing, the electrical components including at least a controller, a memory, and a display, the display being provided at or adjacent the front surface of the housing; and a cover disposed over the display. A portion of at least one of the housing and the cover comprises the glass-based article of any of aspects (27) to (35).

BRIEF DESCRIPTION OF THE DRAWINGS

The accompanying figures, which are incorporated in and constitute a part of this specification, illustrate several embodiments described below.

DETAILED DESCRIPTION

Figure 1:
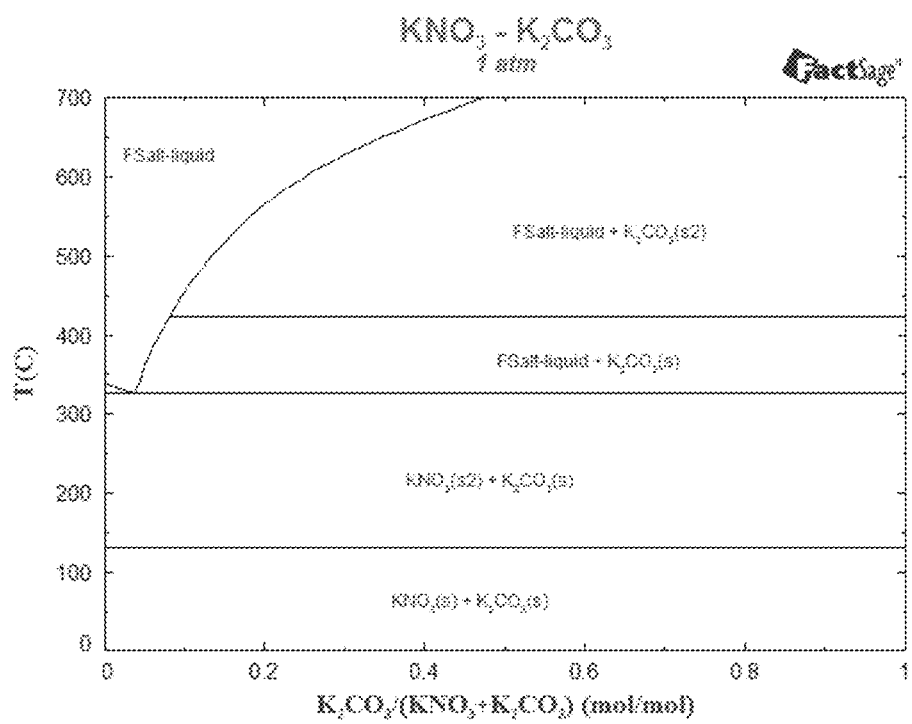
FIG. 1 is a phase diagram of a $KNO_3$—$K_2CO_3$ system.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

Definitions and Measurement Techniques

The terms "glass-based article" and "glass-based substrates" are used to include any object made wholly or partly of glass, including glass-ceramics (including an amorphous phase and a crystalline phase). Laminated glass-based articles include laminates of glass and non-glass materials, laminates of glass and crystalline materials. Glass-based substrates according to one or more embodiments can be selected from soda-lime silicate glass, alkali-alumino silicate glass, alkali-containing borosilicate glass, alkali-containing aluminoborosilicate glass, and alkali-containing glass-ceramics.

A "base composition" is a chemical make-up of a substrate prior to any ion exchange (IOX) treatment. That is, the base composition is undoped by any ions from IOX. A composition at the center of a glass-based article that has been IOX treated is typically the same as the base composition when IOX treatment conditions are such that ions supplied for IOX do not diffuse into the center of the substrate. In one or more embodiments, a composition at the center of the glass article comprises the base composition.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant.

Unless otherwise specified, all compositions described herein are expressed in terms of mole percent (mol %) on an oxide basis.

Reference to "poisoning ions" means small monovalent ions (like $Na^+$ or $Li^+$) eluted from the glass-based substrate during the ion exchange or some bivalent ions (like $Ca^{2+}$ and $Mg^{2+}$) as residual contaminants existing in the salt. Poisoning ions may interfere with salt bath ions present for ion exchange.

A "stress profile" is a plot of stress with respect to position of a glass-based article. A compressive stress region, where the glass-based article is under compressive stress, extends from a first surface to a depth of compression (DOC) of the article. A central tension region extends from the DOC and includes the region where the glass-based article is under tensile stress.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, compressive stress (CS) is expressed as a positive or absolute value—i.e., as recited herein, CS=|CS|. In addition, tensile stress is expressed herein as a negative (<0) stress. Central tension (CT) refers to tensile stress in a central region or a central tension region of the glass-based article. Maximum central tension (maximum CT or $CT_{max}$) refers to the maximum tensile stress in the central tension region. In some embodiments, maximum CT occurs in the central tension region nominally at 0.5·t, where t is the article thickness.

Figure 7:
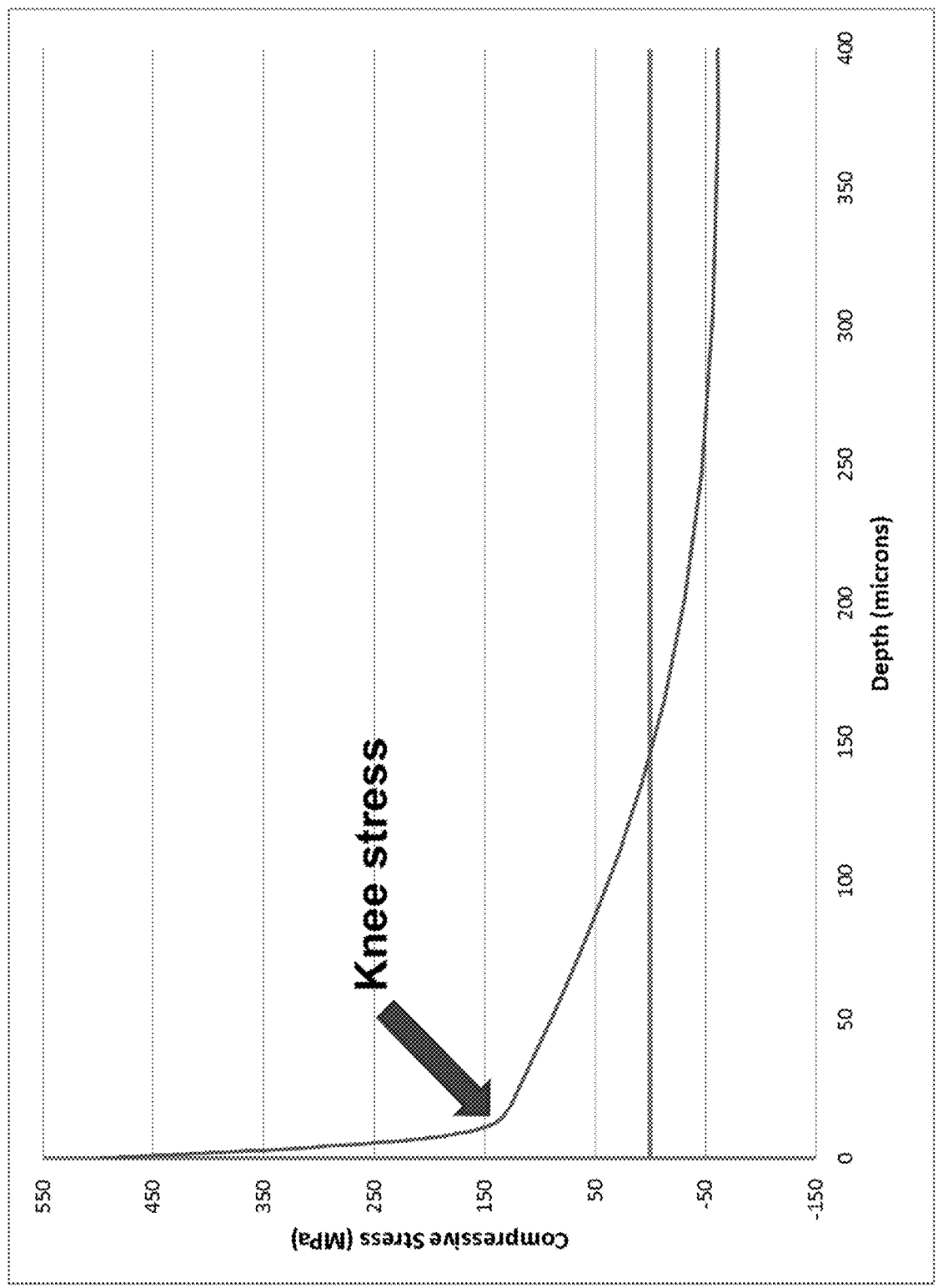
FIG. 7 is a schematic representation of a stress profile including a knee stress.

A "knee" of a stress profile is a depth of an article where the slope of the stress profile transitions from steep (a spike region) to gradual (a deep region). The steep portion of the stress profile extending from the surface into the glass-based article is referred to as the "spike." The knee may refer to a transition area over a span of depths where the slope is changing. The knee compressive stress ($CS_k$) is defined as the value of compressive stress that the deeper portion of the CS profile extrapolates to at the depth of spike ($DOL_{sp}$). The $DOL_{sp}$ is reported as measured by a surface-stress meter by known methods. A schematic representation of a stress profile including a knee stress is provided in FIG. 7.

A non-zero metal oxide concentration that varies from the first surface to a depth of layer (DOL) with respect to the metal oxide or that varies along at least a substantial portion of the article thickness (t) indicates that a stress has been generated in the article as a result of ion exchange. The variation in metal oxide concentration may be referred to herein as a metal oxide concentration gradient. The metal oxide that is non-zero in concentration and varies from the first surface to a DOL or along a portion of the thickness may be described as generating a stress in the glass-based article. The concentration gradient or variation of metal oxides is created by chemically strengthening a glass-based substrate in which a plurality of first metal ions in the glass-based substrate is exchanged with a plurality of second metal ions.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass-based article (i.e., the distance from a surface of the glass-based article to its interior region) at which an ion of a metal oxide or alkali metal oxide (e.g., the metal ion or alkali metal ion) diffuses into the glass-based article where the concentration of the ion reaches a minimum value, as determined by Glow Discharge—Optical Emission Spectroscopy (GD-OES)). In some embodiments, the DOL is given as the depth of exchange of the slowest-diffusing or largest ion introduced by an ion exchange (IOX) process.

Unless otherwise specified, CT and CS are expressed herein in megaPascals (MPa), thickness is express in millimeters and DOC and DOL are expressed in microns (micrometers).

Compressive stress at the surface is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The maximum CT value is measured using a scattered light polariscope (SCALP) technique known in the art.

DOC may be measured by FSM or SCALP depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth (or DOL) of potassium ions in such glass articles is measured by FSM.

Refracted near-field (RNF) method may also be used to measure attributes of the stress profile. When the RNF method is utilized, the maximum CT value provided by SCALP is utilized. In particular, the stress profile measured by the RNF method is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass-based article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

Enhanced Ion Exchange (IOX) Treatment

Methods disclosed herein utilize salts that are dissolvable/highly soluble in conventional molten salt IOX baths for enhanced ion exchange. Typical gettering salt additives have not previously been used to alter bath chemistry for IOX enhancement. Methods herein add one or more salts, for example, carbonate salts, to conventional nitrate salts (e.g., $KNO_3$, $NaNO_3$, and their mixture). Unlike the conventional approach which adds a salt additive in small amounts, often in their solid state, only to precipitate poisoning ions in the molten salt bath, methods of the present disclosure show a boost in ion exchange chemical activity of a salt bath by adding a salt that is dissolvable/highly soluble in the conventional nitrate salt. In this way, the additional salt, having the same metal ions as the molten salt of the salt bath, is a solute of the molten nitrate salt to alter the bath chemistry for IOX chemical activity boost. Conditions of the methods herein keep any poisoning ions present in their dissolved state. With respect to use of, for example, carbonate salts in the molten salt bath, the carbonate anion seems to deactivate poisoning ions (especially $Li^+$) in the molten salt without precipitation, which reduces the negative impact of the poisoning $Li^+$ ions on the ion exchange. The combination of poisoning ion removal and exchange activity boost further enhances the effect of the additional salt, resulting in superior IOX efficiency and performance that has not been achieved from conventional use of salt additives. This approach can be used as a universal strategy for any ion exchangeable glasses, and is particularly effective for soda lime silicates and Li-containing aluminosilicates.

The methods of the present disclosure are advantageous in that, for example, there is an increase in maximum compressive stress (CS), which may be the stress at the article surface, and compressive stress at the knee ($CS_k$), leading to an improvement in mechanical performance such as damage resistance, drop performance, and scratch resistance. The methods are amenable to all alkali-containing glass-based substrates (e.g., glasses and glass ceramics) capable of ion-exchange. The methods provide both the benefits of IOX efficiency enhancement for mechanical performance improvement and maintaining any poisoning ions present in their dissolved state. Improved stress profiles for glasses that suffer from significant viscoelastic stress relaxation from ion-exchange are also achieved. DOL enhancement at longer IOX times without a significant drop in IOX induced stress is also achieved.

The methods herein provide flexibility and space for bath chemistry/property engineering to meet the needs of IOX process development in IOX efficiency, salt corrosive control and bath viscosity requirements. The chemistry of the molten salt bath impacts the IOX performance of the process. An additional salt may be one or more of: $K_2CO_3$, $Na_2CO_3$, $K_3PO_4$, $Na_3PO_4$, $K_2SO_4$, $Na_2SO_4$, $K_3BO_3$, $Na_3BO_3$, KCl, NaCl, KF, and NaF. The additional salt is added to a conventional molten salt bath (e.g., nitrates such as $KNO_3$ and/or $NaNO_3$) as a dissolved liquid solute so that the ion exchange process is carried out and IOX efficiency can be enhanced. The selection of the additional salt(s) and how to use them may be guided by thermochemical calculations of a molten nitrate salt of a metal ion with an additional salt of the same metal ion but differing anion. Two factors can be obtained from this thermochemical calculation. One factor is solubility of a salt in the molten nitrate salt, which determines an upper limit of the additional salt in the molten nitrate salt solution. A second factor is a ratio of oxide activities ($a_{K2O}/a_{Na2O}$) where $a_{K2O}$ and $a_{Na2O}$ are the activities of $K_2O$ and $Na_2O$, respectively. The ratio of oxide activities ($a_{K2O}/a_{Na2O}$) can be used as a merit parameter to measure the IOX efficiency of $K^+ \leftrightarrow Na^+$ ion exchange of a salt solution.

Figure 2:
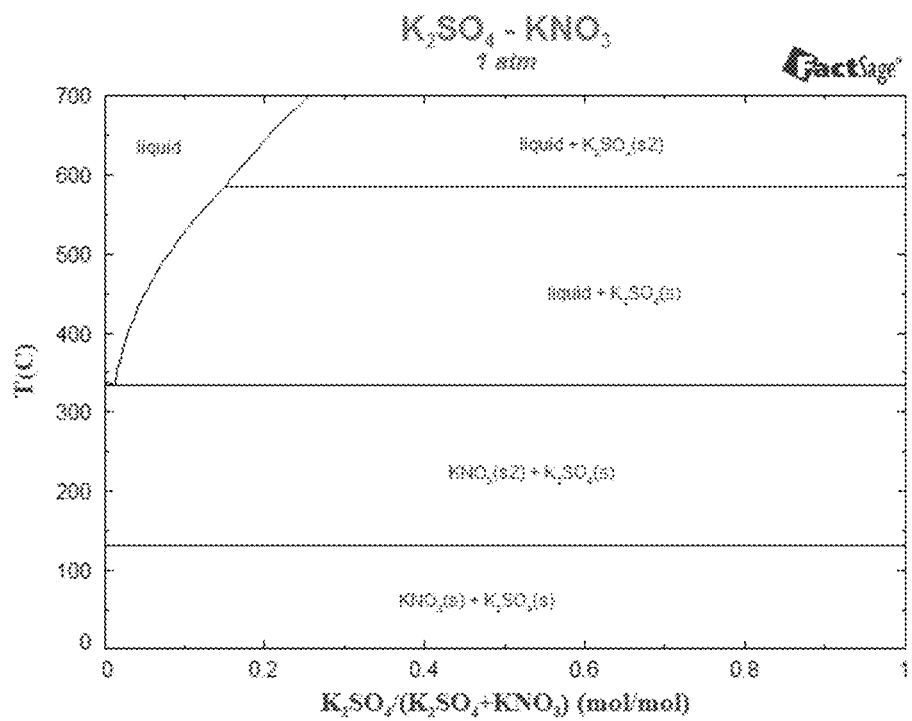
FIG. 2 is a phase diagram of a $KNO_3$—$K_2SO_4$ system.

Turning to the figures, FIG. 1 shows a phase diagram of a $KNO_3$—$K_2CO_3$ system, and FIG. 2 shows a phase diagram of a $KNO_3$—$K_2SO_4$ system, which were obtained from thermochemical calculation via FactSage software. The solubility of two additional salts ($K_2CO_3$ and $K_2SO_4$) in the molten $KNO_3$ nitrate can be derived from the phase diagrams in FIGS. 1 and 2. $K_2CO_3$ has a higher solubility in molten $KNO_3$ salt than $K_2SO_4$.

Figure 3:
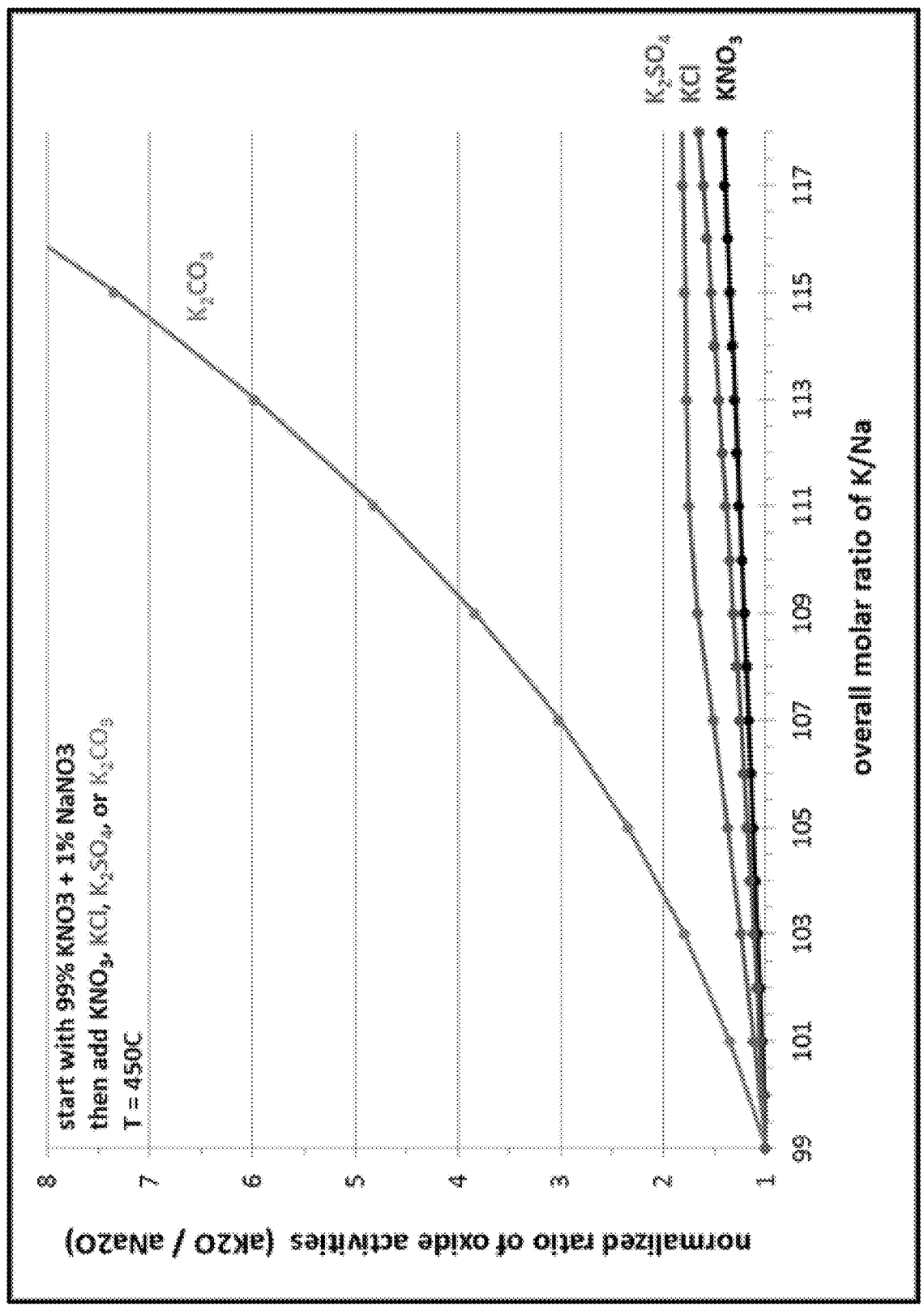
FIG. 3 is a graph of the ratio of oxide activities ($a_{K2O}/a_{Na2O}$) as a function of amount of additive addition for three additives ($K_2CO_3$, $K_2SO_4$, and KCl)

FIG. 3 is a graph of a ratio of oxide activities ($a_{K2O}/a_{Na2O}$) as a function of the amount of additive addition for three additives ($K_2CO_3$, $K_2SO_4$, and KCl) as determined by thermochemical calculation via FactSage software for a series of glass-based substrates that were IOX'd in a conventional bath of 99 wt % $KNO_3$ and 1% $NaCO_3$ to which one additional salt: $KNO_3$, KCl, $K_2SO_4$, or $K_2CO_3$ was added at varying amounts. From this thermochemical analysis, it can be concluded that addition of $K_2CO_3$ to a nitrate bath provides a higher activity boost for IOX enhancement as compared to $K_2SO_4$ and KCl, which show modest expected IOX enhancement. The order of additive efficiency may be described as $K_2CO_3 \gg K_2SO_4 > KCl > KNO_3$.

Additions below the saturation point are more effective than additions past the saturation point. Higher temperatures are beneficial, as they increase the saturation point.

Generally, the methods herein occur in the absence of heat treatment to the glass-based substrate. That is, in one or more embodiments, strengthening is obtained only by IOX treatment. The IOX treatment may include pre-heating the glass-based substrates prior to contacting with the IOX bath, without being considered to include a heat treatment of the glass-based substrates for the purposes of strengthening the glass-based substrates.

The IOX baths may comprise further ions including but not limited to silver, copper, zinc, titanium, rubidium, cesium, calcium, and magnesium for imparting further desired properties. For example, copper or silver ions may be included in an IOX bath for the purposes of providing an antimicrobial effect to the glass-based articles.

The ion exchange processes may independently be a thermal-diffusion process or an electro-diffusion process. Non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath diluted with an effluent ion, followed by immersion in a second bath having a smaller concentration of the effluent ion than the first bath. The contents of U.S. Pat. Nos. 8,561,429 and 8,312,739 are incorporated herein by reference in their entireties. It should be understood that the general concepts described in the aforementioned patents apply to IOX treatments that include multiple baths and IOX treatments that include a single bath. The IOX treatments described herein may include contacting a glass-based substrate with a single bath.

Methods of manufacturing a glass-based article disclosed herein include: exposing a glass-based substrate to an ion exchange treatment to form the glass-based article. The glass-based substrate contains an alkali metal oxide in a base composition, and the glass-based substrate has opposing first and second surfaces defining a substrate thickness (t). The ion exchange treatment includes a bath including a mixture of molten salts. The mixture of molten salts includes: a first salt including a metal ion that has a larger ionic radii than the alkali metal of the alkali metal oxide in the base composition; and a second salt that is dissolved in the first salt and includes the same metal ion as the first salt with an anion that is different from the anion of the first salt.

In a detailed aspect, methods of manufacturing a glass-based article include: exposing a glass-based substrate to an ion exchange treatment to form the glass-based article. The glass-based substrate contains lithium, and the glass-based substrate has opposing first and second surfaces defining a substrate thickness (t). The ion exchange treatment includes a bath including a mixture of molten salts. The mixture of molten salts includes: potassium nitrate ($KNO_3$); optionally sodium nitrate ($NaNO_3$); and potassium carbonate ($K_2CO_3$) and optionally sodium carbonate ($Na_2CO_3$) that is respectively dissolved in the potassium nitrate ($KNO_3$) and optionally the sodium nitrate ($NaNO_3$); wherein the $K_2CO_3$ and the optional $Na_2CO_3$ remain at or below their solubility limit and any lithium ions that are or become present in the bath remain at or below their solubility limit. In one or more embodiments, 4 ions are present in the molten salt mixture ($K^+$, $Na^+$, $NO_3^-$, $CO_3^{2-}$).

In one or more embodiments, the first salt is a non-carbonate salt and the second salt is a carbonate salt.

In one or more embodiments, the alkali metal oxide in the base composition comprises lithium; the first salt comprises potassium nitrate, sodium nitrate, or a mixture of potassium and sodium nitrates; and the second salt comprises one or more of: $K_2CO_3$, $Na_2CO_3$, $K_3PO_4$, $Na_3PO_4$, $K_2SO_4$, $Na_2SO_4$, $K_3BO_3$, $Na_3BO_3$, KCl, NaCl, KF, and NaF.

In one or more embodiments, temperature of the bath may be in the range of greater than or equal to 370° C. to less than or equal to 500° C., such as greater than or equal to 380° C. to less than or equal to 450° C., greater than or equal to 390° C. to less than or equal to 440° C., greater than or equal to 400° C. to less than or equal to 430° C., greater than or equal to 410° C. to less than or equal to 420° C., and all values and subranges therebetween or any and all ranges formed from any of these endpoints.

In one or more embodiments, the second salt may remain at or below its solubility limit in the first salt. The second salt may also remain at or below its solubility limit in the bath generally.

In one or more embodiments, any poisoning ions are present at or below their solubility limit in the mixture of molten salts. In one or more embodiments, the poisoning ions comprise the alkali metal of the alkali metal oxide in the base composition.

Methods herein may further comprise exposing the glass-based substrate to an additional strengthening treatment selected from the group consisting of: ion exchange, thermal annealing, and combinations thereof. Other methods may exclude additional such strengthening methods. Additionally, the glass-based articles may be subjected to post-IOX processing, such as polishing, or the deposition of surface coatings.

In one or more embodiments, potassium carbonate and optionally sodium carbonate are present in a concentration at their respective solubility limits in the respective potassium nitrate and optional sodium nitrate at the temperature of the bath.

In one or more embodiments, a molar ratio of the $K_2CO_3$ to the sum of $K_2CO_3$ and $KNO_3$ is in the range of greater than or equal to 0.05 to less than or equal to 0.15, where the temperature of the bath is in the range of greater than or equal to 370° C. to less than or equal to 500° C.

In one or more embodiments, for a glass-based substrate comprising an alkali-aluminosilicate and a temperature of the bath in the range of greater than or equal to 370° C. to less than or equal to 500° C., the mixture of molten salts includes (by weight): $KNO_3$ in an amount in the range of 0 to 99.9%; $NaNO_3$ in an amount in the range of 0 to 99.9%; $K_2CO_3$ in an amount in the range of 0.1 to 20%; and $Na_2CO_3$ in an amount in the range of 0 to 20%, with the proviso that the amounts of $KNO_3$, $NaNO_3$, $K_2CO_3$, and $Na_2CO_3$ total 100%. In some embodiments, $KNO_3$ is present in an amount in the range of 40 to 99.5%; $NaNO_3$ is present in an amount in the range of 0 to 60%; $K_2CO_3$ is present in an amount in the range of 0.5 to 10%; and $Na_2CO_3$ is present in an amount in the range of 0 to 10%.

In one or more embodiments, the molten salt bath includes (by weight) a first salt, such as $KNO_3$, in an amount in the range of 0 to less than or equal to 99.9%. For example the molten salt bath may include the first salt in an amount in the range of greater than 0 to less than or equal to 99.9%, such as greater than or equal to 1 to less than or equal to 99%, greater than or equal to 2 to less than or equal to 95%, greater than or equal to 3 to less than or equal to 90%, greater than or equal to 5 to less than or equal to 85%, greater than or equal to 10 to less than or equal to 80%, greater than or equal to 15 to less than or equal to 75%, greater than or equal to 20 to less than or equal to 70%, greater than or equal to 25 to less than or equal to 65%, greater than or equal to 30 to less than or equal to 60%, greater than or equal to 35 to less than or equal to 55%, greater than or equal to 40 to less than or equal to 50%, greater than or equal to 45%, or any and all sub-ranges between these endpoints.

In one or more embodiments, the molten salt bath includes (by weight) a second salt, such as $NaNO_3$, in an amount in the range of 0 to less than or equal to 99.9%. For example the molten salt bath may include the second salt in an amount in the range of greater than 0 to less than or equal to 99.9%, such as greater than or equal to 1 to less than or equal to 99%, greater than or equal to 2 to less than or equal to 95%, greater than or equal to 3 to less than or equal to 90%, greater than or equal to 5 to less than or equal to 85%, greater than or equal to 10 to less than or equal to 80%, greater than or equal to 15 to less than or equal to 75%, greater than or equal to 20 to less than or equal to 70%, greater than or equal to 25 to less than or equal to 65%, greater than or equal to 30 to less than or equal to 60%, greater than or equal to 35 to less than or equal to 55%, greater than or equal to 40 to less than or equal to 50%, greater than or equal to 45%, or any and all sub-ranges between these endpoints.

In one or more embodiments, the molten salt bath includes (by weight) an additional salt, such as $K_2CO_3$, in an amount in the range of greater than or equal to 0.1 to less than or equal to 20%. For example the molten salt bath may include the additional salt in an amount in the range of greater than or equal to 0.2 to less than or equal to 19%, such as greater than or equal to 0.3 to less than or equal to 18%, greater than or equal to 0.4 to less than or equal to 17%, greater than or equal to 0.5 to less than or equal to 16%, greater than or equal to 0.6 to less than or equal to 15%, greater than or equal to 0.7 to less than or equal to 14%, greater than or equal to 0.8 to less than or equal to 13%, greater than or equal to 0.9 to less than or equal to 12%, greater than or equal to 1.0 to less than or equal to 11%, greater than or equal to 2 to less than or equal to 10%, greater than or equal to 3 to less than or equal to 9%, greater than or equal to 4 to less than or equal to 8%, greater than or equal to 5 to less than or equal to 7%, greater than or equal to 6%, or any and all sub-ranges between these endpoints.

In one or more embodiments, the molten salt bath includes (by weight) a second additional salt, such as $Na_2CO_3$, in an amount in the range of greater than or equal to 0 to less than or equal to 20%. For example the molten salt bath may include the second additional salt in an amount in the range of greater than or equal to 0.1 to less than or equal to 19%, such as greater than or equal to 0.2 to less than or equal to 18%, greater than or equal to 0.3 to less than or equal to 17%, greater than or equal to 0.4 to less than or equal to 16%, greater than or equal to 0.5 to less than or equal to 15%, greater than or equal to 0.6 to less than or equal to 14%, greater than or equal to 0.7 to less than or equal to 13%, greater than or equal to 0.8 to less than or equal to 12%, greater than or equal to 0.9 to less than or equal to 11%, greater than or equal to 1 to less than or equal to 10%, greater than or equal to 2 to less than or equal to 9%, greater than or equal to 3 to less than or equal to 8%, greater than or equal to 4 to less than or equal to 7%, greater than or equal to 5 to less than or equal to 6%, or any and all sub-ranges between these endpoints.

General Overview of Properties of Glass-Based Articles

Disclosed herein are glass-based articles having improved stress profiles with a high depth of compression prepared by a universal strategy for strengthening alkali-containing glass or glass-ceramic substrates using enhanced ion-exchange. Methods herein use a same-metal ion salt in combination with conventional nitrate salts during ion exchange. The improved stress profiles have not been achieved for the glass-based substrates under standard ion exchange conditions utilized in the industry. By way of example, for a typical soda lime glass composition that is capable of ~500 MPa compressive stress (CS) and ~15 micrometers depth of layer (DOL), the methodology described herein can achieve ~100 MPa CS increase with little impact on DOL (see Comparative Example A and Example 1 herein).

The resulting glass-based articles have an engineered or designed stress profile with a depth of compression (DOC) that is greater than or equal to 3.75% of the article's thickness (t). For example, the glass-based articles may have a DOC greater than or equal to 4% of t, such as greater than or equal to 5% of t, greater than or equal to 6% of t, greater than or equal to 7% of t, greater than or equal to 8% of t, greater than or equal to 9% of t, greater than or equal to 10% of t, greater than or equal to 15% of t, or more, and all values and sub-ranges therebetween. In one or more embodiments, the glass-based article has a DOC that is greater than or equal to 30 micrometers, such as greater than or equal to 32 micrometers, greater than or equal to 34 micrometers, greater than or equal to 36 micrometers, greater than or equal to 38 micrometers, greater than or equal to 40 micrometers, greater than or equal to 42 micrometers, greater than or equal to 44 micrometers, greater than or equal to 46 micrometers, greater than or equal to 48 micrometers, or more, and all values and sub-ranges therebetween. By way of example, a DOC of 30 micrometers is 6% of a 0.5 millimeter thick substrate and 3.75% of a 0.8 millimeter thick substrate.

In one or more embodiments, the resulting glass-based articles have an engineered or designed stress profile with a spike depth of layer ($DOL_{sp}$) that is greater than or equal to 5 microns. For example, the $DOL_{sp}$ may be greater than or equal to 5.5 microns, such as greater than or equal to 6 microns, greater than or equal to 6.5 microns, greater than or equal to 7 microns, greater than or equal to 7.5 microns, greater than or equal to 8 microns, greater than or equal to 8.5 microns, greater than or equal to 9 microns, greater than or equal to 9.5 microns, greater than or equal to 10 microns, greater than or equal to 10.5 microns, greater than or equal to 11 microns, greater than or equal to 11.5 microns, greater than or equal to 12 microns, greater than or equal to 12.5 microns, greater than or equal to 13 microns, greater than or equal to 13.5 microns, greater than or equal to 14 microns, greater than or equal to 14.5 microns, greater than or equal to 15 microns, greater than or equal to 15.5 microns, greater than or equal to 16 microns, greater than or equal to 16.5 microns, greater than or equal to 17 microns, greater than or equal to 17.5 microns, greater than or equal to 18 microns, greater than or equal to 20 microns, greater than or equal to 25 microns, greater than or equal to 30 microns, greater than or equal to 35 microns, greater than or equal to 40 microns, greater than or equal to 45 microns, greater than or equal to 50 microns, or more, and all values and sub-ranges therebetween. In one or more embodiments, a ratio of the DOC to the $DOL_{sp}$ is greater than 1:1, such as greater than or equal to 6:1, greater than or equal to 10:1, and all values and sub-ranges therebetween. In embodiments, the $DOL_{sp}$ of the glass-based article may be equivalent to the DOL of potassium ions ($DOL_K$).

The glass-based articles may also have a stress profile having a maximum compressive stress (CS) of greater than or equal to 350 MPa, such as greater than or equal to 400 MPa, greater than or equal to 450 MPa, greater than or equal to 500 MPa, greater than or equal to 550 MPa, greater than or equal to 600 MPa, greater than or equal to 650 MPa, greater than or equal to 700 MPa, greater than or equal to 750 MPa, greater than or equal to 800 MPa, greater than or equal to 850 MPa, greater than or equal to 900 MPa, greater than or equal to 950 MPa, greater than or equal to 1000 MPa, greater than or equal to 1050 MPa, or more, and all values and sub-ranges therebetween. In an embodiment, the CS of the glass-based article is greater than or equal to 1000 MPa at one or both surfaces. In some embodiments, the maximum CS may be located at the surface of the glass-based articles. In one or more embodiments, the glass-based articles include stress profiles that provide improved damage resistance, drop performance, and/or scratch resistance. The glass-based articles may be used in consumer electronics, transportation applications, architectural applications, defense applications, medical applications, packaging applications, and any other applications where a thin, strong glass product is advantageous.

One or more embodiments provide that the glass-based article comprises the metal ions at a non-zero concentration that varies from the first surface to a depth of layer (DOL). In a detailed embodiment, the glass-based article comprises potassium and sodium at a non-zero concentration that varies from the first surface to at least a portion of the substrate thickness (t).

The glass-based articles herein may further comprise one or more further ion-exchanged metals selected from the group consisting of: silver, copper, zinc, titanium, rubidium, cesium, calcium, magnesium, and oxides thereof. A concentration of the one or more additional metal oxide may vary from the first surface to at least a portion of the substrate thickness (t).

In embodiments, the glass-based articles include a sodium ion concentration profile in the spike region that is convex (also referred to as concave up). In embodiments, the convex region of may be located in the region extending from the surface of the glass-based articles to a depth of 5 μm. The sodium concentration profile may be measured by secondary ion mass spectroscopy (SIMS), as is known in the art, and may be plotted as the sodium ion intensity as a function of depth below the surface of the glass-based article. In some cases the sodium ion intensity may be normalized for the sake of convenience. Without wishing to be bound by any particular theory, the convex region of the sodium ion concentration profile may be a result of the IOX methods described herein, such as those including a carbonate salt. For this reason, the convex region of the sodium ion concentration profile may be utilized to identify glass-based articles produced utilizing the IOX methods described herein. Additionally, the convex region of the sodium ion concentration profile may also be described as having a positive second derivative value.

One or more embodiments provide that the maximum compressive stress of the glass-based article is increased relative to exposing the glass-based substrate to a bath comprising the first salt in the absence of the second salt. One or more specific embodiments provide that the maximum compressive stress is increased relative to exposing the glass-based substrate to a bath comprising $KNO_3$ and $NaNO_3$, in the absence of $K_2CO_3$.

One or more embodiments provide that maximum compressive stress degradation as a function of the increase of the poisoning ion concentration in the bath is reduced relative to exposing the glass-based substrate to a bath comprising the first salt in the absence of the second salt.

One or more embodiments provide that the compressive stress at the depth of layer of the metal ion is increased relative to exposing the glass-based substrate to a bath comprising the first salt in the absence of the second salt.

One or more embodiments provide that stress relaxation of the glass-based article is reduced relative to exposing the glass-based substrate to a bath comprising the first salt in the absence of the second salt.

Figure 4A:
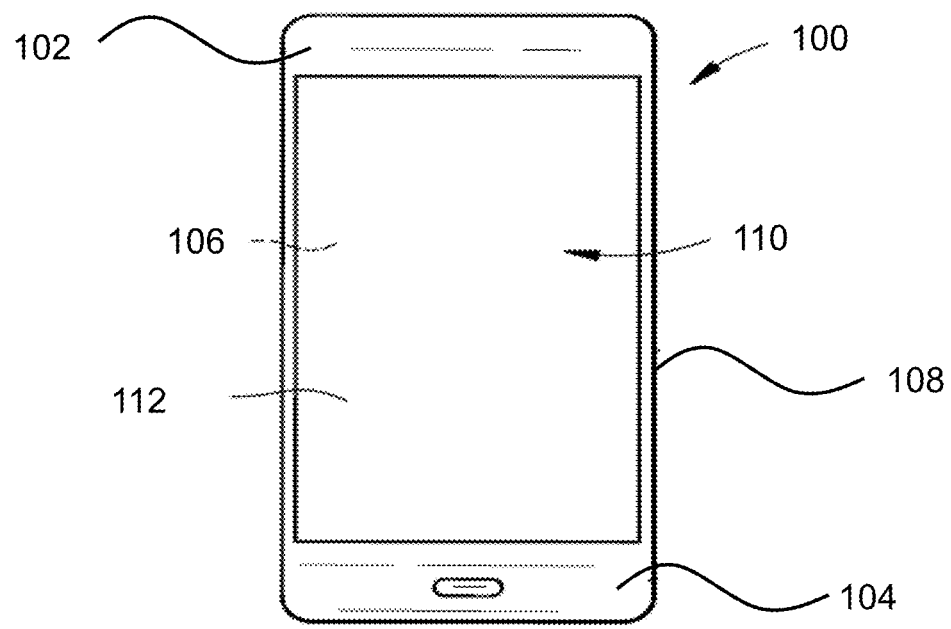
FIG. 4A is a plan view of an exemplary electronic device incorporating any of the glass-based articles disclosed herein.
Figure 4B:
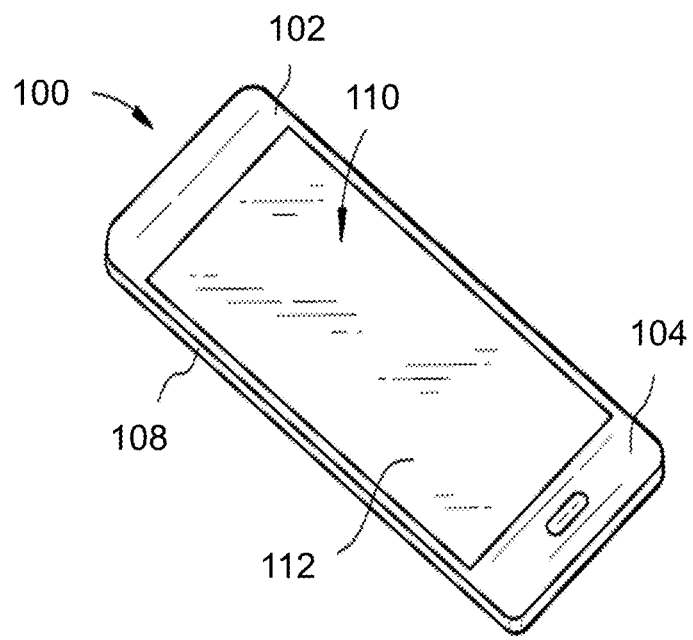
FIG. 4B is a perspective view of the exemplary electronic device of FIG. 4A.

In one or more embodiments, the glass-based articles herein have a thickness (t) in the range of 0.1 mm to 10 mm, 0.2 mm to 9 mm, 0.3 mm to 8 mm, 0.4 mm to 7 mm, 0.5 mm to 6 mm, 0.6 mm to 5 mm, 0.7 mm to 4 mm, 0.8 mm to 3 mm, 0.9 mm to 2 mm, and 1 mm to 1.9 mm, and all values and sub-ranges therebetween An exemplary article incorporating any of the strengthened articles disclosed herein is shown in FIGS. 4A and 4B. Specifically, FIGS. 4A and 4B show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In some embodiments, at least one of a portion of the housing and the cover substrate 112 may include any of the strengthened articles disclosed herein.

Glass-Based Substrates

Examples of glass-based substrates that may be used to form the glass-based articles include, but are not limited to, soda-lime silicate glass, an alkali aluminosilicate glass, an alkali-containing borosilicate glass, an alkali aluminoborosilicate glass, an alkali-containing lithium aluminosilicate glass, or an alkali-containing phosphate glass. The glass-based substrates have compositions that may be characterized as ion exchangeable. As used herein, "ion exchangeable" means that a substrate comprising the composition is capable of exchanging cations located at or near the surface of the substrate with cations of the same valence that are either larger or smaller in size.

Thickness of the substrate (t) may be in the range of greater than or equal to 50 microns to less than or equal to 10 millimeters, such as greater than or equal to 100 micrometers to less than or equal to 9 millimeters, greater than or equal to 200 micrometers to less than or equal to 8 millimeters, greater than or equal to 300 micrometers to less than or equal to 7 millimeters, greater than or equal to 400 micrometers to less than or equal to 6 millimeters, greater than or equal to 500 micrometers to less than or equal to 5 millimeters, greater than or equal to 600 micrometers to less than or equal to 4 millimeters, greater than or equal to 700 micrometers to less than or equal to 3 millimeters, greater than or equal to 800 micrometers to less than or equal to 2 millimeters, greater than or equal to 900 micrometers to less than or equal to 1 millimeter, greater than or equal to 400 micrometers to less than or equal to 800 micrometers, and all values and subranges therebetween.

Exemplary substrates may comprise but are not limited to: a soda lime silicate glass, alkali aluminosilicate glass, alkali-containing borosilicate glass, alkali-containing aluminoborosilicate glass, and alkali-containing glass-ceramics. In one or more embodiments, the glass-based substrate has an alkali metal oxide content of 2 mole % or greater.

In an embodiment, the glass substrate comprises a soda lime silicate glass. In an embodiment, the soda lime silicate glass composition of a glass-based substrate is, on an oxide basis: 73.5 wt. % $SiO_2$, 1.7 wt. % $Al_2O_3$, 12.28 wt. % $Na_2O$, 0.24 wt. % $K_2O$, 4.5 wt. % MgO, 7.45 wt. % CaO, 0.017 wt. % $ZrO_2$, 0.032 wt. % $TiO_2$, 0.002 wt. % $SnO_2$, 0.014 wt. % SrO, 0.093 wt. % $Fe_2O_3$, 0.001 wt. % $HfO_2$, 0.028 wt. % Cl oxide(s), and 0.203 wt. % $SO_3$.

In embodiments, the glass-based substrate may be a lithium aluminosilicate. In embodiments, the glass-based substrates may be formed from any composition capable of forming the stress profiles. For example, the glass-based substrates may be formed from the lithium aluminosilicate compositions described in U.S. Patent App. Pub. No. 2016/0376186 A1 titled "Glass with High Surface Strength, published Dec. 29, 2016, the entirety of which is incorporated herein by reference. In embodiments, the glass-based substrate may have a composition including: from greater than or equal to 58 mol % to less than or equal to 65 mol % $SiO_2$; from greater than or equal to 11 mol % to less than or equal to 19 mol % $Al_2O_3$; from greater than or equal to 5.5 mol % to less than or equal to 7 mol % $Li_2O$; from greater than or equal to 0.5 mol % to less than or equal to 3 mol % $P_2O_5$; from greater than or equal to 6 mol % to less than or equal to 18 mol % $Na_2O$; from greater than or equal to 0.01 mol % to less than or equal to 1 mol % $SnO_2$; and from greater than or equal to 0.1 mol % to less than or equal to 2 mol % ZnO.

In some embodiments, the glass-based substrates may be formed from the glass compositions described in U.S. Patent App. Pub. No. 2019/0161390 A1 titled "Glasses with Low Excess Modifier Content," and published May 30, 2019 (claiming priority from U.S. Provisional Application No. 62/591,953 titled "Glasses with Low Excess Modifier Content," filed Nov. 29, 2017), the entirety of which is incorporated herein by reference. In some embodiments, the glass articles may be formed from the glass compositions described in U.S. Patent App. Pub. No. 2019/0161386 A1 titled "Ion-Exchangeable Mixed Alkali Aluminosilicate Glasses," and published May 30, 2019 (claiming priority from U.S. Provisional Application No. 62/591,958 titled "Ion-Exchangeable Mixed Alkali Aluminosilicate Glasses," filed Nov. 29, 2017), the entirety of which is incorporated herein by reference.

In embodiments, the glass-based substrates include $SiO_2$ in an amount greater than or equal to 58 mol %. In one or more embodiments, the glass-based substrate comprises $SiO_2$ in an amount greater than or equal to 58 mol % to less than or equal to 65 mol %, from greater than or equal to 59 mol % to less than or equal to 65 mol %, from greater than or equal to 60 mol % to less than or equal to 65 mol %, from greater than or equal to 61 mol % to less than or equal to 65 mol %, from greater than or equal to 62 mol % to less than or equal to 65 mol %, from greater than or equal to 63 mol % to less than or equal to 65 mol %, from greater than or equal to 58 mol % to less than or equal to 64 mol %, from greater than or equal to 58 mol % to less than or equal to 63 mol %, from greater than or equal to 58 mol % to less than or equal to 62 mol %, from greater than or equal to 58 mol % to less than or equal to 61 mol %, from greater than or equal to 58 mol % to less than or equal to 60 mol %, from greater than or equal to 63 mol % to less than or equal to 65 mol %, from greater than or equal to 63.2 mol % to less than or equal to 65 mol %, from greater than or equal to 63.3 mol % to less than or equal to 65 mol %, and any and all subranges formed from any of these endpoints. $SiO_2$ is the primary glass forming oxide in the glass-based substrates and forms the network backbone for the molten glass.

In embodiments, the glass-based substrates include $Al_2O_3$ in an amount greater than or equal to 11 mol %. In one or more embodiments, the glass-based substrates include $Al_2O_3$ in an amount greater than or equal to 11 mol % to less than or equal to 20 mol %, from greater than or equal to 12 mol % to less than or equal to 20 mol %, from greater than or equal to 13 mol % to less than or equal to 20 mol %, from greater than or equal to 14 mol % to less than or equal to 20 mol %, from greater than or equal to 15 mol % to less than or equal to 20 mol %, from greater than or equal to 11 mol % to less than or equal to 19 mol %, from greater than or equal to 11 mol % to less than or equal to 18.5 mol %, from greater than or equal to 11 mol % to less than or equal to 18 mol %, from greater than or equal to 11 mol % to less than or equal to 17.5 mol %, from greater than or equal to 11 mol % to less than or equal to 17 mol %, from greater than or equal to 11 mol % to less than or equal to 16.5 mol %, from greater than or equal to 11 mol % to less than or equal to 16 mol %, from greater than or equal to 14 mol % to less than or equal to 17 mol %, from greater than or equal to 15 mol % to less than or equal to 17 mol %, from greater than or equal to 15 mol % to less than or equal to 16 mol %, and any and all subranges formed from any of these endpoints. Like $SiO_2$, $Al_2O_3$ is a network former and contributes to the rigidity to the glass network in the glass-based substrates.

In embodiments, the glass-based substrates include $P_2O_5$. In one or more embodiments, the glass-based substrates include $P_2O_5$ in an amount greater than or equal to 0.5 mol % to less than or equal to 5 mol %, such as from greater than or equal to 0.6 mol % to less than or equal to 5 mol %, from greater than or equal to 0.8 mol % to less than or equal to 5 mol %, from greater than or equal to 1 mol % to less than or equal to 5 mol %, from greater than or equal to 1.2 mol % to less than or equal to 5 mol %, from greater than or equal to 1.4 mol % to less than or equal to 5 mol %, from greater than or equal to 1.5 mol % to less than or equal to 5 mol %, from greater than or equal to 1.6 mol % to less than or equal to 5 mol %, from greater than or equal to 1.8 mol % to less than or equal to 5 mol %, from greater than or equal to 2 mol % to less than or equal to 5 mol %, from greater than or equal to 0.5 mol % to less than or equal to 3 mol %, from greater than or equal to 0.6 mol % to less than or equal to 3 mol %, from greater than or equal to 0.8 mol % to less than or equal to 3 mol %, from greater than or equal to 1 mol % to less than or equal to 3 mol %, from greater than or equal to 1.2 mol % to less than or equal to 3 mol %, from greater than or equal to 1.4 mol % to less than or equal to 3 mol %, from greater than or equal to 1.5 mol % to less than or equal to 3 mol %, from greater than or equal to 1.6 mol % to less than or equal to 3 mol %, from greater than or equal to 1.8 mol % to less than or equal to 3 mol %, from greater than or equal to 2 mol % to less than or equal to 3 mol %, from greater than or equal to 0.5 mol % to less than or equal to 2.8 mol %, from greater than or equal to 0.5 mol % to less than or equal to 2.6 mol %, from greater than or equal to 0.5 mol % to less than or equal to 2.5 mol %, from greater than or equal to 0.5 mol % to less than or equal to 2.4 mol %, from greater than or equal to 0.5 mol % to less than or equal to 2.2 mol %, from greater than or equal to 0.5 mol % to less than or equal to 2 mol %, from greater than or equal to 2.5 mol % to less than or equal to 5 mol %, from greater than or equal to 2.5 mol % to less than or equal to 4 mol %, from greater than or equal to 2.5 mol % to less than or equal to 3 mol %, and any and all subranges formed from any of these endpoints. Incorporating $P_2O_5$ in the glass-based substrates increases the ion-exchange interdiffusion rate, which may decrease the necessary IOX time, and improves glass compatibility with zircon refractory materials.

In embodiments, the glass-based substrates may be substantially free or free of $B_2O_3$. The presence of $B_2O_3$ in the glass-based substrate may have a negative impact on compressive stress when the glass-based substrate is strengthened by ion exchange.

In embodiments, the glass-based substrates include $Na_2O$. In embodiments, the glass-based substrates include $Na_2O$ in an amount greater than or equal to 4 mol % to less than or equal to 20 mol % $Na_2O$, such as from greater than or equal to 4.5 mol % to less than or equal to 20 mol %, from greater than or equal to 5 mol % to less than or equal to 20 mol %, from greater than or equal to 5.5 mol % to less than or equal to 20 mol %, from greater than or equal to 6 mol % to less than or equal to 20 mol %, from greater than or equal to 6.5 mol % to less than or equal to 20 mol %, from greater than or equal to 7 mol % to less than or equal to 20 mol %, from greater than or equal to 7.5 mol % to less than or equal to 20 mol %, from greater than or equal to 8 mol % to less than or equal to 20 mol %, from greater than or equal to 8.5 mol % to less than or equal to 20 mol %, from greater than or equal to 9 mol % to less than or equal to 20 mol %, from greater than or equal to 9.5 mol % to less than or equal to 20 mol %, from greater than or equal to 10 mol % to less than or equal to 20 mol %, from greater than or equal to 4 mol % to less than or equal to 19.5 mol %, from greater than or equal to 4 mol % to less than or equal to 19 mol %, from greater than or equal to 4 mol % to less than or equal to 18.5 mol %, from greater than or equal to 4 mol % to less than or equal to 18 mol %, from greater than or equal to 4 mol % to less than or equal to 17.5 mol %, from greater than or equal to 4 mol % to less than or equal to 17 mol %, from greater than or equal to 4 mol % to less than or equal to 16.5 mol %, from greater than or equal to 4 mol % to less than or equal to 16 mol %, from greater than or equal to 4 mol % to less than or equal to 15.5 mol %, from greater than or equal to 4 mol % to less than or equal to 15 mol %, from greater than or equal to 4 mol % to less than or equal to 14.5 mol %, from greater than or equal to 4 mol % to less than or equal to 14 mol %, from greater than or equal to 6 mol % to less than or equal to 18 mol %, from greater than or equal to 7 mol % to less than or equal to 18 mol %, from greater than or equal to 8 mol % to less than or equal to 18 mol %, from greater than or equal to 9 mol % to less than or equal to 18 mol %, from greater than or equal to 6 mol % to less than or equal to 12 mol %, from greater than or equal to 6 mol % to less than or equal to 11 mol %, from greater than or equal to 6 mol % to less than or equal to 10 mol %, and any and all subranges formed from any of these endpoints. The alkali oxide $Na_2O$ is used to achieve chemical strengthening of the alkali aluminosilicate glass-based substrates described herein by ion exchange.

In embodiments, the glass-based substrates include $Li_2O$. In embodiments, the glass-based substrates include $Li_2O$ in amount from greater than or equal to 0 mol % to less than or equal to 13 mol %, such as from greater than 0 mol % to less than or equal to 9.5 mol %, from greater than or equal to 0 mol % to less than or equal to 9 mol %, from greater than or equal to 0 mol % to less than or equal to 8.5 mol %, from greater than or equal to 0 mol % to less than or equal to 8 mol %, from greater than or equal to 0 mol % to less than or equal to 7.5 mol %, from greater than or equal to 0 mol % to less than or equal to 7 mol %, from greater than or equal to 0.1 mol % to less than or equal to 10 mol %, from greater than or equal to 0.1 mol % to less than or equal to 9.5 mol %, from greater than or equal to 0.1 mol % to less than or equal to 9 mol %, from greater than or equal to 0.1 mol % to less than or equal to 8.5 mol %, from greater than or equal to 0.1 mol % to less than or equal to 8 mol %, from greater than or equal to 0.1 mol % to less than or equal to 7.5 mol %, from greater than or equal to 0.1 mol % to less than or equal to 7 mol %, from greater than or equal to 4 mol % to less than or equal to 8 mol %, and any and all subranges formed from any of these endpoints. The presence of $Li_2O$ in the glass-based substrates allows for the exchange of both potassium and sodium ions into the glass-based substrate during ion exchange, enabling the stress profiles described herein.

In embodiments, the glass-based substrates have an $R_2O/Al_2O_3$ molar ratio of less than 2, where $R_2O$ is the total alkali metal oxide content of the glass-based substrate. In embodiments, the glass-based substrates have an $R_2O/Al_2O_3$ molar ratio of greater than or equal to 0.9 to less than or equal to 1.6.

soda lime silicate (SLS) glass had the following composition on an oxide basis: 73.5 wt. % $SiO_2$, 1.7 wt. % $Al_2O_3$, 12.28 wt. % $Na_2O$, 0.24 wt. % $K_2O$, 4.5 wt. % MgO, 7.45 wt. % CaO, 0.017 wt. % $ZrO_2$, 0.032 wt. % $TiO_2$, 0.002 wt. % $SnO_2$, 0.014 wt. % SrO, 0.093 wt. % $Fe_2O_3$, 0.001 wt. % $HfO_2$, 0.028 wt. % Cl oxide(s), and 0.203 wt. % $SO_3$.

Table 1 provides a summary of IOX conditions and resulting compressive stress (CS), spike depth of layer ($DOL_{sp}$), and $\Delta m/m$, where m is the mass of the substrate and $\Delta m$ is the difference between the post-IOX mass of the glass-based article and the pre-IOX mass of the glass-based substrate. Comparative Example A is a control, where the SLS substrate was exposed to IOX treatment in the presence of two salts having differing metal ions: potassium nitrate ($KNO_3$) and sodium nitrate ($NaNO_3$), for durations of 4 hours and 12 hours. In Example 1, the SLS substrate was exposed to enhanced IOX treatment in the presence of three salts (two different salts having the same metal ion and one salt having a different metal ion): sodium nitrate ($NaNO_3$), potassium nitrate ($KNO_3$), and potassium carbonate ($K_2CO_3$), for durations of 4 hours and 12 hours. In the Doping Example, the SLS was doped with Li to create a Li-doped SLS substrate. Comparative Example B is a control, where the Li-doped SLS substrate was exposed to IOX treatment in the presence of two salts having differing metal ions: potassium nitrate ($KNO_3$) and sodium nitrate ($NaNO_3$), for durations of 4 hours and 12 hours. In Example 2, the Li-doped SLS substrate was exposed to enhanced IOX treatment in the presence of three salts (two different salts having the same metal ion and one salt having a different metal ion): sodium nitrate ($NaNO_3$), potassium nitrate ($KNO_3$), and potassium carbonate ($K_2CO_3$) for durations of 4 hours and 12 hours.

TABLE 1

| EXAMPLE | $KNO_3$ (wt %) | $NaNO_3$ (wt %) | $Li_2NO_3$ (wt %) | $K_2CO_3$ (wt %) | Temp (° C.) | Time (hours) | CS (MPa) | $DOL_{sp}$ (μm) | $\Delta m/m$ (%) |
|---|---|---|---|---|---|---|---|---|---|
| Comparative Example A | 90 | 10 | — | 0 | 430 | 4 | 354.3 | 8.0 | — |
|  | 90 | 10 | — | 0 | 430 | 12 | 318.5 | 14.6 | — |
| Example 1 | 89 | 10 | — | 1 | 430 | 4 | 387.9 | 7.9 | — |
|  | 89 | 10 | — | 1 | 430 | 12 | 393.6 | 12.9 | — |
| Doping Example | 25 | 74 | 1 | 0 | 490 | 12 | 3.3 | — | −0.3111 |
| Comparative Example B | 90 | 10 | — | 0 | 430 | 4 | 297.1 | — | 0.0392 |
|  | 90 | 10 | — | 0 | 430 | 12 | 197.0 | — | 0.0756 |
| Example 2 | 89 | 10 | — | 1 | 430 | 4 | 558.4 | — | 0.0468 |
|  | 89 | 10 | — | 1 | 430 | 12 | 541.0 | — | 0.0799 |

EXAMPLES

Various embodiments will be further clarified by the following examples. In the Examples, prior to being strengthened, the Examples are referred to as "substrates". After being subjected to strengthening, the Examples are referred to as "articles" or "glass-based articles".

A surface stress meter (FSM), the FSM-6000, manufactured by Orihara Industrial Co., Ltd. (Japan) was used to measure compressive stress at the surface (CS) and depth of layer ($DOL_{sp}$).

Examples 1 and 2 and Comparative Examples A and C

Glass-based articles were formed from exposure of a soda lime silicate glass substrate to ion exchange treatments. The For Examples 1 and 2, the molten salt bath compositions were, by weight percent: 89 wt % $KNO_3$, 10 wt % $NaNO_3$; and 1 wt % $K_2CO_3$, and were, by mole percent: 87.6 mol % $K_2CO_3$; 11.7 mol % $NaNO_3$; and 0.7 mol % $K_2CO_3$. For Examples 1 and 2, the molar ratio ($K_2CO_3$)/($K_2CO_3$+$KNO_3$) of the molten salt bath was 0.008.

Table 1 shows that enhanced IOX efficacy was achieved by dissolving $K_2CO_3$ into a molten potassium nitrate salt. For Example 1 (SLS) and Example 2 (Li-doped SLS), including $K_2CO_3$ during IOX with $KNO_3$ significantly increased CS.

For Example 1, CS increased 5.7 MPa with increased IOX time from 4 hours to 12 hours. For Comparative Example A, however, CS decreased 38.5 MPa with increased IOX time from 4 hours to 12 hours. For Example 2, CS decreased only 17.4 MPa with increased IOX time from 4 hours to 12 hours. For Comparative Example B, however, CS decreased about 100 MPa with increased IOX time from 4 hours to 12 hours. Therefore, for both Examples 1 and 2, stress relaxation was significantly reduced by including $K_2CO_3$ during IOX with $KNO_3$.

Values for Δm/m (%) for Example 2 are larger than for Comparative Example B, indicating that $K_2CO_3$ enhanced the IOX efficiency, as evidenced by the larger weight-gain for Example 2.

A comparison of Example 1 (SLS) with Example 2 (Li-doped SLS) indicates that Li-doped glass showed greater enhancement from the $K_2CO_3$ addition. The $K_2CO_3$ addition to the molten salt bath utilized with the Li-doped glass substrate produced a glass-based article with a greatly increased CS.

Figure 5:
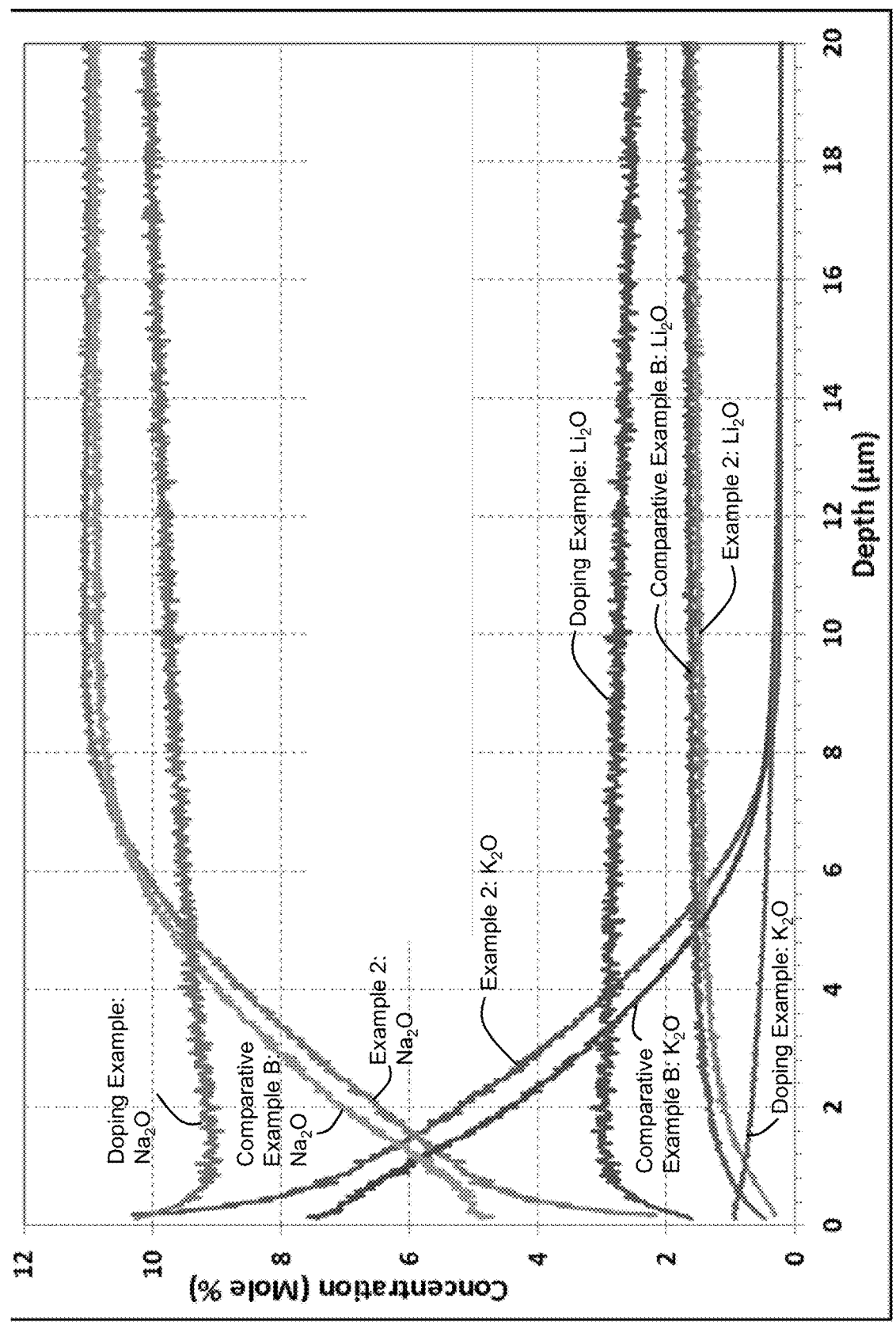
FIG. 5 is a graph of concentration profiles versus depth obtained from GD-OES (Glow Discharge—Optical Emission Spectroscopy) (air side) for the Doping Example, Comparative Example B, and Example 2.

FIG. 5 is a graph of concentration profiles versus depth obtained from GD-OES (Glow Discharge—Optical Emission Spectroscopy) (air side) for the Doping Example, Comparative Example B, and Example 2. For Example 2, there was a significant increase in surface $K_2O$ concentration and a significant decrease in surface $Na_2O$ concentration relative to the Doping Example and Comparative Example B, this change was at least in part responsible for the above-described significant CS increase. The presence of $K_2CO_3$ also slightly decreased the equilibrium $Li_2O$ concentration at the surface, which is also beneficial for stress profile enhancement.

Examples 3-11 and Comparative Examples C-E

Glass-based articles were formed from exposure of a Li-containing aluminosilicate glass substrate to ion exchange treatments. The substrate had the following composition: 63.60 mol % $SiO_2$, 15.67 mol % $Al_2O_3$, 10.81 mol % $Na_2O$, 6.24 mol % $Li_2O$, 1.16 mol % ZnO, 0.04 mol % $SnO_2$, and 2.48 mol % $P_2O_5$.

Varying concentrations of $K_2CO_3$ in the IOX bath with $KNO_3$ and $NaNO_3$ were tested. Two substrate thicknesses, 0.5 mm and 0.8 mm, were tested.

Table 2 provides a summary of IOX conditions. Comparative Examples C, D, and E did not contain $K_2CO_3$; IOX treatment was in the presence of two salts having differing metal ions: potassium nitrate ($KNO_3$) and sodium nitrate ($NaNO_3$) at varying concentrations. In Examples 3-11, the IOX treatment was conducted with a molten salt bath containing three salts (two different salts having the same metal ion and one salt having a different metal ion): sodium nitrate ($NaNO_3$), potassium nitrate ($KNO_3$), and potassium carbonate ($K_2CO_3$) at varying concentrations ($K_2CO_3$ was nominally at 2 wt %, 5 wt %, 7 wt %, and 9.5 wt %).

TABLE 2

| EXAMPLE | $KNO_3$ (mol %/ wt %) | $NaNO_3$ (mol %/ wt %) | $K_2CO_3$ (mol %/ wt %) | $K_2CO_3$/ $K_2CO_3$ + $KNO_3$ | Temp. (° C.) |
|---|---|---|---|---|---|
| Comparative Example C | 98.8/99 | 1.2/1 | 0/0 | 0 | 380 |
| Example 3 | 95.17/94.1 | 1.2/1 | 3.63/4.9 | 0.050 | 380 |
| Comparative Example D | 89.34/90.88 | 10.66/9.12 | 0/0 | 0 | 380 |
| Example 4 | 85.69/86 | 10.67/9 | 3.64/5 | 0.055 | 380 |
| Comparative Example E | 77.08/80 | 22.92/20 | 0/0 | 0 | 380 |
| Example 5 | 75.65/78.1 | 22.93/19.9 | 1.42/2 | 0.025 | 380 |
| Example 6 | 73.44/75.18 | 22.92/19.72 | 3.64/5.1 | 0.064 | 380 |
| Example 7 | 72.05/73.38 | 22.92/19.62 | 5.03/7 | 0.087 | 380 |
| Example 8 | 70.2/71 | 22.93/19.5 | 6.87/9.5 | 0.118 | 380 |
| Example 9 | 70.2/71 | 22.93/19.5 | 6.87/9.5 | 0.118 | 400 |
| Example 10 | 70.2/71 | 22.93/19.5 | 6.87/9.5 | 0.118 | 380 |
| Example 11 | 70.2/71 | 22.93/19.5 | 6.87/9.5 | 0.118 | 400 |

Table 3 provides a summary of resulting compressive stress (CS), spike depth of layer ($DOL_{sp}$), and Δm/m, where m is the mass of the substrate and Δm is the difference between the post-IOX mass of the glass-based article and the pre-IOX mass of the glass-based substrate.

TABLE 3

| | Substrate thickness = 0.8 mm | | | | Substrate thickness = 0.5 mm | | | |
|---|---|---|---|---|---|---|---|---|
| EXAMPLE | Time (minutes) | CS (MPa) | $DOL_{sp}$ (μm) | Δm/m (%) | Time (minutes) | CS (MPa) | $DOL_{sp}$ (μm) | Δm/m (%) |
| Comparative Example C | 240 | 982.0 | 16.5 | 0.3173 | 120 | 942.7 | 11.8 | 0.3478 |
| Example 3 | 240 | 1048.2 | 17.4 | 0.2896 | 120 | 1039.3 | 12.9 | 0.3399 |
| Comparative Example D | 240 | 780.7 | 15.4 | 0.4874 | 120 | 736.4 | 11.8 | 0.5342 |
| Example 4 | 240 | 855.6 | 15.3 | 0.4455 | 120 | 801.7 | 11.7 | 0.5021 |
| Comparative Example E | 240 | 670.5 | 14.9 | 0.5619 | 120 | 642.5 | 10.2 | 0.6978 |
| Example 5 | 240 | 693.5 | 14.6 | 0.5453 | 120 | 654.0 | 11.2 | 0.6090 |
| Example 6 | 240 | 722.9 | 14.5 | 0.5359 | 120 | 696.6 | 11.1 | 0.5978 |
| Example 7 | 240 | 755.8 | 14.3 | 0.5107 | 120 | 718.4 | 11.3 | 0.5793 |
| Example 8 | — | — | — | — | 120 | 734.4 | 11.9 | 0.5784 |
| Example 9 | — | — | — | — | 120 | 744.0 | 15.8 | 0.7178 |
| Example 10 | — | — | — | — | 240 | 725.8 | 15.9 | 0.7816 |
| Example 11 | — | — | — | — | 240 | 722.3 | 18.9 | 0.8546 |

Figure 6:
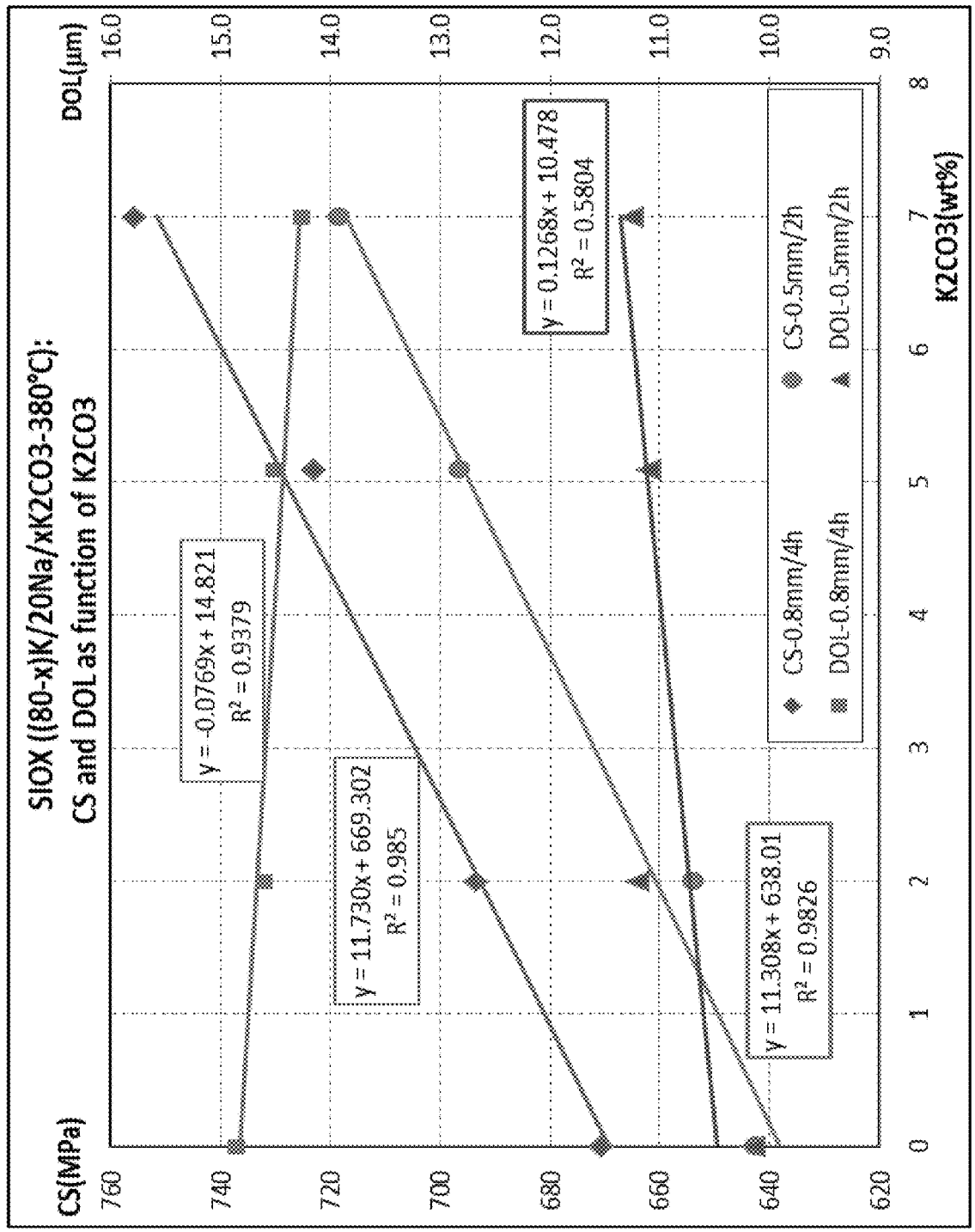
FIG. 6 is a graph showing compressive stress (CS) and depth of layer (μm) as a function of $K_2CO_3$ concentration for Comparative Example E, Example 6, Example 7, and Example 8 for thicknesses of 0.8 mm and 0.5 mm.

FIG. 6 is a graph showing compressive stress (CS) and depth of layer (μm) as a function of $K_2CO_3$ concentration (wt %) for Comparative Example E, Example 6, Example 7, and Example 8 for substrate thicknesses of 0.8 mm and 0.5 mm. As shown in FIG. 6, CS linearly increases with $K_2CO_3$ concentration. Methods herein maintain $K_2CO_3$ concentration at or below its solubility limit in the $KNO_3$. Both 0.5 mm and 0.8 mm thicknesses have a similar linear correlation between CS and $K_2CO_3$ concentration with a slope of ~11.5 MPa/wt %.

The CS boosting effect from the $K_2CO_3$ addition is reduced with increasing $NaNO_3$ concentration. The CS boosting effect from the $K_2CO_3$ addition is enhanced with an increased molten salt bath temperature.

Impact from the $K_2CO_3$ addition on $DOL_{sp}$ showed different behaviors for glass-based substrates with thickness of 0.5 mm and 0.8 mm. For 0.8 mm thick samples, the $DOL_{sp}$ linearly decreased with increasing $K_2CO_3$ concentration, and for 0.5 mm thick samples, the $DOL_{sp}$ slightly increased with increasing $K_2CO_3$ concentration.

$K_2CO_3$ addition demonstrated a capacity of boosting CS by ~100 MPa and beyond.

Examples 12 and 13 and Comparative Example F

Glass-based articles were formed from exposure of a Li-containing aluminosilicate glass substrate to ion exchange treatments. The substrate had the following composition: 63.60 mol % $SiO_2$, 15.67 mol % $Al_2O_3$, 10.81 mol % $Na_2O$, 6.24 mol % $Li_2O$, 1.16 mol % ZnO, 0.04 mol % $SnO_2$, and 2.48 mol % $P_2O_5$.

Varying concentrations of $K_2CO_3$ in the IOX bath with $KNO_3$ and $NaNO_3$ were tested. The IOX treatment was conducted for 65 minutes, and the IOX bath was at a temperature of 380° C.

Table 4 provides a summary of IOX conditions. Comparative Example F did not contain $K_2CO_3$; IOX treatment was in the presence of two salts having differing metal ions: potassium nitrate ($KNO_3$) and sodium nitrate ($NaNO_3$). In Examples 12 and 13, the IOX treatment was conducted with a molten salt bath containing three salts (two different salts having the same metal ion and one salt having a different metal ion): sodium nitrate ($NaNO_3$), potassium nitrate ($KNO_3$), and potassium carbonate ($K_2CO_3$) at varying concentrations.

TABLE 4

| EXAMPLE | $KNO_3$ (wt %) | $NaNO_3$ (wt %) | $K_2CO_3$ (wt %) | Time (min) | Temp. (° C.) |
|---|---|---|---|---|---|
| Comparative Example F | 91 | 9 | 0 | 65 | 380 |
| Example 12 | 86 | 9 | 5 | 65 | 380 |
| Example 13 | 88.5 | 9 | 2.5 | 65 | 380 |

The sodium ion and potassium ion concentration profiles of each glass-based article were measured using SIMS, as described above. Comparative Example F exhibited a concave (alternatively referred to as concave down) normalized sodium ion concentration in the spike region (surface to $DOL_{sp}$) of the glass-based article, with the concave region extending throughout the entirety of the spike region. Examples 12 and 13 exhibited a convex (alternatively referred to as concave up) normalized sodium ion concentration in the spike region of the glass-based article. The normalized sodium ion concentration profile of Examples 12 and 13 became concave at or near the $DOL_{sp}$. The normalized sodium ion profiles of Comparative Example F and Examples 12 and 13 indicate that the IOX processes described herein, such as those including a carbonate salt, produce glass-articles with normalized sodium ion concentration profiles that are not produced with other IOX processes that do not include a carbonate salt. Additionally, the normalized potassium ion profiles of Examples 12 and 13 included more potassium in near-surface regions and at the surface than Comparative Example F. The normalized potassium ion concentration of Examples 12 and 13 and Comparative Example F intersected at a depth corresponding to about 10% of the maximum potassium ion concentration.

While the foregoing is directed to various embodiments, other and further embodiments of the disclosure may be devised without departing from the basic scope thereof, and the scope thereof is determined by the claims that follow.

What is claimed is:

1. A method of manufacturing a glass-based article comprising:
   exposing a glass-based substrate to a molten salt bath to form the glass-based article, wherein the glass-based substrate contains an alkali metal oxide, the glass-based substrate has opposing first and second surfaces defining a substrate thickness (t), and the molten salt bath comprises:
   a first salt including a metal ion that has a larger ionic radii than an alkali metal of the alkali metal oxide and a first anion; and
   a second salt that is dissolved in the molten salt bath and includes the same metal ion as the first salt and a second anion different from the first anion of the first salt,
   wherein:
   a concentration of the second salt remains at or below its solubility limit in the molten salt bath; and
   the molten salt bath comprises poisoning ions and a concentration of the poisoning ions is at or below their solubility limit in the molten salt bath.

2. The method of claim 1, wherein the first salt is a non-carbonate salt and the second salt is a carbonate salt.

3. The method of claim 1, wherein the alkali metal oxide in the glass-based substrate comprises lithium; the first salt comprises potassium nitrate, sodium nitrate, or a mixture of potassium and sodium nitrates; and the second salt comprises one or more of: $K_2CO_3$, $Na_2CO_3$, $K_3PO_4$, $Na_3PO_4$, $K_2SO_4$, $Na_2SO_4$, $K_3BO_3$, $Na_3BO_3$, KCl, NaCl, KF, and NaF.

4. The method of claim 1, wherein a temperature of the molten salt bath is from 370° C. to 500° C.

5. The method of claim 1, wherein a molar ratio of the second salt to a sum of the first salt and the second salt is from 0.05 to 0.15.

6. The method of claim 1, wherein the second salt increase a chemical activity of the first salt in the molten salt bath compared to a chemical activity of the first salt alone.

7. The method of claim 1, wherein the molten salt bath further comprises one or more of silver, copper, or combinations thereof.

8. The method of claim 1, wherein the glass-based substrate is exposed to the molten salt bath for an exposure time from 65 minutes to 12 hours.

9. The method of claim 1, wherein the poisoning ions are lithium ions.

10. A method of manufacturing a glass-based article comprising:
    exposing a glass-based substrate to a molten salt bath to form the glass-based article, wherein the glass-based substrate contains lithium, the glass-based substrate has opposing first and second surfaces defining a substrate thickness (t), and the molten salt bath comprises:
    potassium nitrate ($KNO_3$); and
    potassium carbonate ($K_2CO_3$) that is dissolved in the molten salt bath,
    wherein a concentration of the $K_2CO_3$ remains at or below its solubility limit in the molten salt bath, and a concentration of lithium ions in the molten salt bath remains at or below their solubility limit in the molten salt bath.

11. The method of claim 10, wherein the molten salt bath further comprises:
    sodium nitrate ($NaNO_3$); and
    sodium carbonate ($Na_2CO_3$) that is dissolved in the molten salt bath;
    wherein a concentration of the $Na_2CO_3$ remains at or below its solubility limit in the molten salt bath.

12. The method of claim 10, wherein a temperature of the molten salt bath is from 370° C. to less to 500° C.

13. The method of claim 10, wherein a molar ratio of the $K_2CO_3$ to a sum of $K_2CO_3$ and $KNO_3$ is from 0.05 to 0.15.

14. The method of claim 10, wherein the molten salt bath comprises by weight:
    from greater than 0% to 99.9% $KNO_3$;
    from 0% to 99.9% $NaNO_3$;
    from 0.1% to 20% $K_2CO_3$; and
    from 0% to 20% $Na_2CO_3$ with the proviso that amounts of $KNO_3$, $NaNO_3$, $K_2CO_3$, and $Na_2CO_3$ total 100%.

15. The method of claim 10, wherein the molten salt bath comprises by weight:
    from 40% to 99.5% $KNO_3$;
    from 0% to 60% $NaNO_3$;
    from 0.5% to 10% $K_2CO_3$; and
    from 0% to 10% $Na_2CO_3$, with the proviso that amounts of $KNO_3$, $NaNO_3$, $K_2CO_3$, and $Na_2CO_3$ total 100%.

16. The method of claim 10, wherein a concentration of any poisoning ions is at or below their solubility limit in the molten salt bath.

17. The method of claim 10, wherein the exposing the glass-based substrate to the molten salt bath generates a compressive stress region extending from the first surface of the glass-based article to a depth of compression (DOC), the compressive stress region having a maximum compressive stress, the maximum compressive stress is greater than a maximum compressive stress of another glass-based article formed by exposing another glass-based substrate to another molten salt bath comprising $KNO_3$ alone, in the absence of $K_2CO_3$, at the same temperature and for the same time as the glass-based substrate.

18. The method of claim 10, wherein $K_2CO_3$ increases a chemical activity of $KNO_3$ in the molten salt bath compared to a chemical activity of $KNO_3$ alone.

19. The method of claim 10, wherein the molten salt bath further comprises one or more of silver, copper, or combinations thereof.

\* \* \* \* \*